(12) United States Patent
Gunawardana et al.

(10) Patent No.: US 9,047,560 B2
(45) Date of Patent: Jun. 2, 2015

(54) USING EVENT STREAM DATA TO CREATE A DECISION GRAPH REPRESENTING A RACE PARTICIPANT WHERE LEAF NODES COMPRISE RATES DEFINING A SPEED OF THE RACE PARTICIPANT IN A RACE SIMULATION

(75) Inventors: Asela Jeevaka Ranaweera Gunawardana, Seattle, WA (US); Christopher A. Meek, Kirkland, WA (US); Puyang Xu, Baltimore, MD (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 255 days.

(21) Appl. No.: 13/172,069

(22) Filed: Jun. 29, 2011

(65) Prior Publication Data
US 2013/0006915 A1     Jan. 3, 2013

(51) Int. Cl.
*G06N 5/02* (2006.01)
*G06N 7/00* (2006.01)
*G06N 7/06* (2006.01)
*G06N 5/04* (2006.01)

(52) U.S. Cl.
CPC .................. *G06N 5/02* (2013.01); *G06N 7/005* (2013.01); *G06N 7/06* (2013.01); *G06N 5/048* (2013.01)

(58) Field of Classification Search
CPC ......... G06N 5/048; G06N 7/005; G06N 7/06; G06N 5/02

USPC ........................................ 706/52; 703/17, 16
See application file for complete search history.

(56) References Cited

U.S. PATENT DOCUMENTS

| | | | |
|---|---|---|---|
| 7,324,984 B2 | 1/2008 | Tovinkere et al. | |
| 7,519,564 B2 | 4/2009 | Horvitz | |
| 7,630,950 B2 | 12/2009 | Wang et al. | |
| 7,644,863 B2 | 1/2010 | Chen et al. | |
| 7,660,705 B1* | 2/2010 | Meek et al. | 703/2 |
| 7,813,870 B2 | 10/2010 | Downs et al. | |
| 2007/0071209 A1 | 3/2007 | Horvitz et al. | |
| 2009/0006290 A1 | 1/2009 | Gunawardana et al. | |
| 2010/0153085 A1* | 6/2010 | Sathish | 703/13 |

OTHER PUBLICATIONS

Yi et al., Online Data Mining for Co-Evolving Time Sequences, In Proc. of the 2000 Int'l Conf. on Data Engineering, pp. 13-22, Mar. 2000.*
Shen, Jianqiang, "Machine Learning for Activity Recognition", Retrieved at <<http://eecs.oregonstate.edu/library/files/2004-70/shenj_qualifier.pdf>>, Retrieved Date: Apr. 7, 2011, pp. 1-15.

(Continued)

*Primary Examiner* — Jeffrey A Gaffin
*Assistant Examiner* — Robert H Bejcek, II (57) ABSTRACT

A method of generating a decision graph from event stream data, wherein the event stream data includes a plurality of events, and each event includes an associated time stamp, includes generating decision nodes for the graph, wherein the decision nodes each comprise a question having a temporal element. The method includes generating leaf nodes for the graph, wherein the leaf nodes each comprise a rate parameter, and iteratively splitting and merging nodes in the graph in order to maximize a measure of purity of outcomes in resulting nodes.

20 Claims, 7 Drawing Sheets

(56) References Cited

OTHER PUBLICATIONS

Berman, Simeon M., "Note on Extreme Values, Competing Risks and Semi-Markov Processes", Retrieved at <<http://projecteuclid.org/DPubS/Repository/1.0/Disseminate?view=body&id=pdf_1&handle=euclid.aoms/1177704036>>, vol. 34 No. 3, 1963, pp. 1104-1106.
Brown, et al., "Multiple Neural Spike Train Data Analysis: State-of-the-art and Future Challenges", Retrieved at <<http://itb.biologie.hu-berlin.de/~kempter/Teaching/2004_SS/brown04.pdf>>, Nature neuroscrience, May 2004, vol. 7 No. 5, pp. 456-461.
Buntine, Wary, "Theory Refinement on Bayesian Networks", Retrieved at <<http://citeseerx.ist.psu.edu/viewdoc/download;jsessionid=AB4596663B2445AAF9488328639E277C?doi=10.1.1.52. 1068&rep=rep1&type=pdf>>, Proceedings of the seventh conference on Uncertainty in artificial intelligence, 1991, pp. 52-60.
Chickering, et al., "A Bayesian Approach to Learning Bayesian Networks with Local Structure", Retrieved at <<http://www.kd-dresearch.org/Groups/Probabilistic-Reasoning/Papers/chickering97bayesian.pdf>>, Proceedings of Thirteenth Conference on Uncertainty in Artificial Intelligence, Aug. 1997, pp. 20.
Daley, et al., "An Introduction to the Theory of Point Processes: vol. I: Elementary Theory and Methods, Second Edition", Retrieved at <<http://sci-lib.org/books_1/D/daley.pdf>>, 2002, pp. 491.
Didelez, Vanessa, "Graphical Models for Marked Point Processes based on Local Independence", Retrieved at <<http://www.stats.bris.ac.uk/~maxvd/B6611R3.pdf>>, Jan. 4, 2008, pp. 1-30.
Fan, et al., "Sampling for Approximate Inference in Continuous Time Bayesian Networks", Retrieved at <<http://citeseerx.ist.psu.edu/viewdoc/download?doi=10.1.1.130.4542&rep=rep1&type=pdf>>, 2008, pp. 8.
Friedman, et al., "Learning the Structure of Dynamic Probabilistic Networks", Retrieved at <<http://citeseerx.ist.psu.edu/viewdoc/download?doi=10.1.1.32.6615&rep=rep1&type=pdf>>, 1998, pp. 9.
Friedman, et al., "Using Bayesian Networks to Analyze Expression Data", Retrieved at <<http://citeseer.ist.psu.edu/viewdoc/download;jsessionid=D3A7B214F29DBB2060AEF492E39CBC35?doi=10.1.1.130.4453&rep=rep1&type=pdf>>, 2000, pp. 601-620.
Heckerman, et al., "Dependency Networks for Inference, Collaborative Filtering, and Data Visualization", Retrieved at <<http://citeseerx.ist.psu.edu/viewdoc/download?doi=10.1.1.89.1151&rep=rep1&type=pdf>>, Oct. 2000, pp. 27.
Kroeger, et al. "The Case for Efficient File Access Pattern Modeling", Retrieved at <<http://citeseerx.ist.psu.edu/viewdoc/download?doi=10.1.1.65.9111&rep=rep1&type=pdf>>, 1996, pp. 6.
Marley, et al., "The "Horse Race" Random Utility Model for Choice Probabilities and Reaction Times, and its Competing Risks Interpretation", Retrieved at <<http://www.staff.uni-oldenburg.de/hans.colonius/download/Marley_colonius_JMP92.pdf>>, Journal of Mathematical Psychology, vol. 36, No. 1, Mar. 1992, pp. 1-20.
Oliner, et al., "What Supercomputers Say: A Study of Five System Logs", Retrieved at <<http://www.cs.utexas.edu/~hestness/papers/oliner-supercomputer_logs.pdf>>, In Proceedings of the International Conference on Dependable Systems and Networks (DSN), 2007, pp. 10.
Rajaram, et al., "Poisson-networks: A Model for Structure Point Processes", Retrieved at <<http://citeseerx.ist.psu.edu/viewdoc/download?doi=10.1.1.59.8350&rep=rep1&type=pdf>>, Jan. 2005, pp. 8.

Simma, et al., "Modeling Events with Cascades of Poisson Processes", Retrieved at <<http://www.cs.berkeley.edu/~jordan/papers/simma-uai10.pdf>>, Proceedings of the Proceedings of the Twenty-Sixth Conference Annual Conference on Uncertainty in Artificial, 2010 pp. 10.
Simma, et al., "CT-NOR: Representing and Reasoning about Events in Continuous Time", Retrieved at <<http://citeseerx.ist.psu.edu/viewdoc/download?doi=10.1.1.143.4357&rep=rep1&type=pdf>>, 2008, pp. 10.
Barber, David., "Learning in Spiking Neural Assemblies", Retrieved at <<http://books.nips.cc/papers/files/nips15/NS07.pdf>>, In Advances in Neural Information Processing Systems, 2003, pp. 8.
Barbieri, et al., "Construction and Analysis of Non-poisson Stimulus-response Models of Neural Spiking Activity", Retrieved at <<http://www.cnbc.cmu.edu/~tai/readings/adaptation/non-poisson-stimulus.pdf>>, Jan. 30, 2001, pp. 13.
Brillinger, at al., "Examples of the Investigation of Neural Information Processing by Point Process Analysis", Retrieved at <<http://www.stat.berkeley.edu/~brill/Papers/marm94.pdf>>, Advanced Methods of Physiological System Modelling, 1994, pp. 111-127.
Cormen, et al., "Introduction to Algorithms", Retrieved at <<http://www.cs.bme.hu/~sali/thalg/clrs8.pdf>>, 2001, pp. 1202.
Dean, et al., "A Model for Reasoning about Persistence and Causation", Retrieved at <<http://www.cs.brown.edu/people/tld/publications/archive/DeanandKanazawaCIJ-89.pdf>>, Sep. 25, 1989 pp. 142-150.
Harris, et al., "Organization of Cell Assemblies in the Hippocampus", Retrieved at <<http://jackknife.med.yale.edu/spikeclub/HarrisNature2003.pdf>>, Jul. 31, 2003, pp. 552-556.
Jordan, et al., "An Introduction to Variational Methods for Graphical Models", Retrieved at <<http://citeseerx.ist.psu.edu/viewdoc/download;jsessionid=0D1A6983126F6E9E417F0BD8387B7B80?doi=10.1.1.61.4999&rep=rep1&type=pdf>>, pp. 183-233.
Kass, et al., "Bayes Factors", Retrieved at <<http://www.stat.cmu.edu/~kass/papers/bayesfactors.pdf>>, Jun. 1995, pp. 773-795.
Murphy, Kevin Patrick., "Dynamic Bayesian Networks: Representation, Inference and Learning", Retrieved at <<http://www.cs.ubc.ca/~murphyk/Thesis/thesis.pdf>>, 2002, pp. 225.
Nodelman, et al., "Continuous Time Bayesian Networks", Retrieved at <<http://citeseerx.ist.psu.edu/viewdoc/download?doi=10.1.1.94.1813&rep=rep1&type=pdf>>, Proceedings of the Eighteenth Conference on Uncertainty in Artificial Intelligence, 2002, pp. 10.
Nodelman, et al., "Learning Continuous Time Bayesian Networks", Retrieved at <<http://robotics.stanford.edu/~nodelman/papers/ctbn-learn.pdf>>, 2003, pp. 8.
Oram, et al., "Stochastic Nature of Precisely Timed Spike Patterns in Visual System Neuronal Responses", Retrieved at <<http://lnpsych.nimh.nih.gov/richmond/triplets_orametal.pdf>>,Feb. 26, 1999, pp. 3021-3033.
Aertsen, A.M.H.J. et al., "Dynamics of Neuronal Firing Correlation: Modulation of Effective Connectivity", Retrieved at <<http://material.brainworks.uni-freiburg.de/publications-brainworks/1989/journal%20papers/Aertsen89.pdf>>, Journal of Neurophysiology, 1989, pp. 900-917.
Brown, et al., "Multiple Neural Spike Train Data Analysis: State-of-the-art and Future Challenges", Retrieved at <<http://itb.biologie.hu-berlin.de/~kempter/Teaching/2004_SS/brown04.pdf>>, Nature Neuroscience, Apr. 27, 2004, pp. 456-461.
Dean, T. et al., "Probabilistic Temporal Reasoning", <<https://www.aaai.org/Papers/AAAI/1988/AAAI88-093.pdf>>, 1988, 5 pages.

\* cited by examiner

USING EVENT STREAM DATA TO CREATE A DECISION GRAPH REPRESENTING A RACE PARTICIPANT WHERE LEAF NODES COMPRISE RATES DEFINING A SPEED OF THE RACE PARTICIPANT IN A RACE SIMULATION

BACKGROUND

The problem of learning temporal dependencies from streams of multivariate discrete events arises in a wide variety of applications. For example, the firing patterns of neurons, gene expression data, file access patterns in operating systems, sales patterns at retailers, browsing patterns on the web, and activity patterns on social networks, can all be viewed as streams of events over time. Events carry both information about their timing and their type (e.g., identity of neuron that fired, customer ID and SKU of sale, file identifier and access type etc.), and the dependencies between events can be on both their timing and their types.

While graphical models such as Bayesian networks and dependency networks are widely used to model the dependencies between variables, they do not directly model time. Dynamic Bayesian Networks (DBNs) allow temporal modeling in discrete time, and Continuous Time Bayesian Networks (CTBNs) model the joint trajectories of discrete valued variables in continuous time. Thus, modeling event streams with DBNs requires choosing a discretization of time, while modeling them with CTBNs requires further modeling assumptions in order to encode event sequences as sequences of state transitions of some set of discrete variables.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One embodiment is directed to an algorithm for modeling the dependencies in event stream data, and for visualizing these dependencies, using graphical event models. By modeling these event streams, questions such as "what is the next query this user will issue and when will they issue it?" and "which files will be accessed in the next week?" can be answered using the model. An algorithm is disclosed for building decision graphs that ask questions about events in the past in order to predict the rate at which each type of event is likely to occur in the future.

One embodiment is directed to a method of generating a decision graph from event stream data, wherein the event stream data includes a plurality of events, and each event includes an associated time stamp. The method includes generating decision nodes for the graph, wherein the decision nodes each comprise a question having a temporal element. The method includes generating leaf nodes for the graph, wherein the leaf nodes each comprise a rate parameter, and iteratively splitting and merging nodes in the graph in order to maximize a measure of purity of outcomes in resulting nodes.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

1. Generating and Using Graphical Event Models to Provide Prediction Data

One embodiment is directed to an algorithm for modeling the dependencies in event stream data, and for visualizing these dependencies, using graphical event models. Examples of event streams include web search logs and system event logs. By modeling these event streams, questions such as "what is the next query this user will issue and when will they issue it?" and "which files will be accessed in the next week?" can be answered using the model. One embodiment is directed to an algorithm for building decision graphs that ask questions about events in the past in order to predict the rate at which each type of event is likely to occur in the future.

A graphical event model according to one embodiment represents temporal dependencies in event streams. In particular, graphical event models describe how events influence each other and the timescales of those influences. Graphical event models can be learned from data, using a closed-form Bayesian approach to learning non-linear temporal dependencies, and probabilistic queries can be answered using Monte Carlo inference techniques. The learning algorithm has been used on both synthetic and real data to recover nonlinear temporal dependencies, and a Monte Carlo inference procedure has been shown to efficiently answer queries on these graphical event models.

In one embodiment, event streams are represented as marked or labeled point processes on the non-negative real line, with discrete labels specifying the types of the events. Graphical event models, which are a class of marked point processes, are generated from the event streams. Graphical event models represent the likelihood of each event given its history using a competing risks representation in terms of crude hazards for each event type. The crude hazard functions can encode arbitrarily complex dependencies on the past, and explicitly model the occurrence of events in time. The competing risks representation allows the dependencies of each event type in the past to be represented in graphical form. It also allows the dependencies of each type of event to be learned independently and in parallel.

A conjugate prior is used for graphical event models whose crude hazards have a piecewise exponential density. This allows for parameter learning and evaluation of the marginal likelihood in closed form. This in turn enables structure learning through a decision graph building procedure yielding decision graph graphical event models. Inference can be carried out using forward sampling for arbitrary finite duration queries for general graphical event models. For the class of queries that specify particular sequences of events in given time intervals, low probability queries are evaluated using importance sampling (e.g., Poisson superposition importance sampling).

The learning and inference procedures described herein have been validated empirically. It has been shown that nonlinear temporal dependency structures can be recovered, including excitatory and inhibitory effects, using a synthetic data set. The Poisson superposition importance sampling has been evaluated in answering probabilistic queries over a model with such nonlinear temporal dependencies. It has also been shown that decision graph graphical event models give predictive and computational gains over Poisson Networks in learning dependencies from real supercomputer event logs. In particular, it has been shown that decision graph graphical event models are able to efficiently model the timing and type of alert messages from a real supercomputer, which is indicative of their value in applications such as predicting failures in datacenters where the timing and the modes of failure are both of interest.

Figure 1:
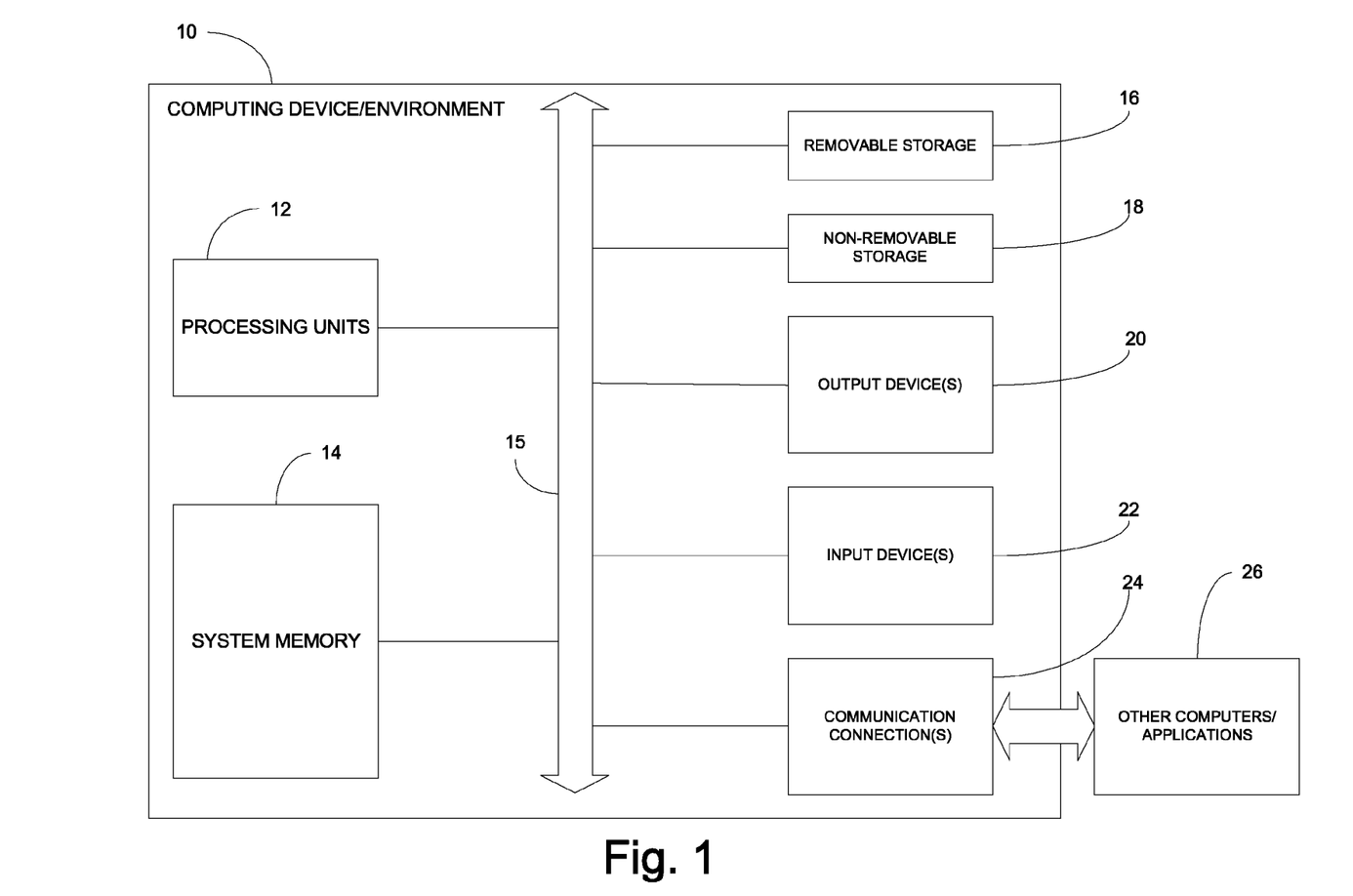
FIG. 1 is a block diagram illustrating a computing environment suitable for implementing aspects of a system for generating and using graphical event models according to one embodiment.

FIG. 1 is a diagram illustrating a computing environment 10 suitable for implementing aspects of a system for generating and using graphical event models according to one embodiment. In the illustrated embodiment, the computing system or computing device 10 includes one or more processing units 12 and system memory 14. Depending on the exact configuration and type of computing device, memory 14 may be volatile (such as RAM), non-volatile (such as ROM, flash memory, etc.), or some combination of the two.

Computing device 10 may also have additional features/functionality. For example, computing device 10 may also include additional storage (removable and/or non-removable) including, but not limited to, magnetic or optical disks or tape. Such additional storage is illustrated in FIG. 1 by removable storage 16 and non-removable storage 18. Computer-readable storage medium includes volatile and nonvolatile, removable and non-removable media implemented in any suitable method or technology for non-transitory storage of information such as computer readable instructions, data structures, program modules or other data, and does not include transitory signals. Memory 14, removable storage 16 and non-removable storage 18 are all examples of computer-readable storage medium (e.g., computer-readable storage medium storing computer-executable instructions that when executed by at least one processor cause the at least one processor to perform a method). Computer-readable storage medium includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store the desired information and that can be accessed by computing device 10. Any such computer-readable storage medium may be part of computing device 10.

The various elements of computing device 10 are communicatively coupled together via one or more communication links 15. Computing device 10 also includes one or more communication connections 24 that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc.

FIG. 1 and the above discussion are intended to provide a brief general description of a suitable computing environment in which one or more embodiments may be implemented. It should be understood, however, that handheld, portable, and other computing devices of all kinds are contemplated for use. FIG. 1 thus illustrates an example of a suitable computing system environment 10 in which the embodiments may be implemented, although as made clear above, the computing system environment 10 is only one example of a suitable computing environment and is not intended to suggest any limitation as to the scope of use or functionality of the embodiments. Neither should the computing environment 10 be interpreted as having any dependency or requirement relating to any one or combination of components illustrated in the exemplary operating environment 10.

Figure 2:
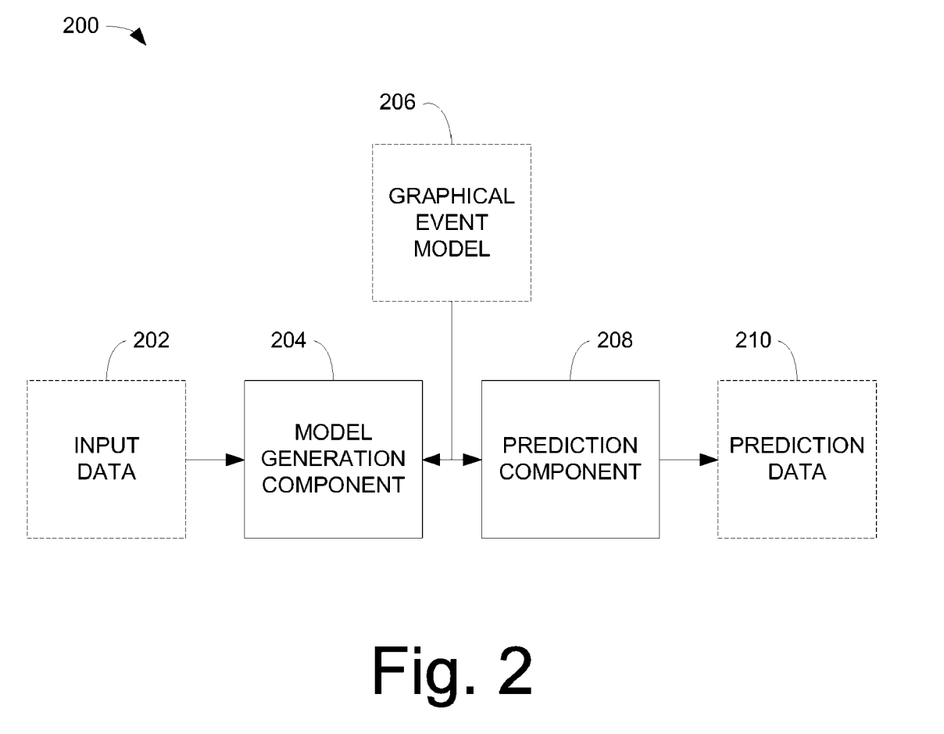
FIG. 2 is a block diagram illustrating a system for generating and using graphical event models to provide prediction data according to one embodiment.

FIG. 2 is a block diagram illustrating a system 200 for generating and using graphical event models to provide prediction data according to one embodiment. System 200 includes a model generation component 204 and a prediction component 208. Model generation component 204 generates a graphical event model 206 based on received input data 202. In one embodiment, the input data 202 is event stream data, such as web search logs or system event logs, with a time associated with each event in the stream. Based on the generated graphical event model 206, prediction component 208 generates prediction data 210 that forecasts future events and times based on past event data.

In the graphical event model 206 according to one embodiment, events of different types are distinguished by labels, l, drawn from a finite alphabet L. An event is then composed of a non-negative time-stamp, t, and a label, l. The graphical event model consists of at least one directed graph, G, over the finite alphabet, L, and a set, Z, of crude hazards indexed by label, l.

In one embodiment, graphical event model 206 includes a plurality of decision graphs (e.g., decision graph 300 shown in FIG. 3 and discussed below), with each individual decision graph in the model 206 corresponding to or representing an event type. In one embodiment, model 206 includes a decision graph for each possible kind of event that might occur. A decision graph according to one embodiment is a directed acyclic graph with exactly one root node. Each non-leaf node has associated with it a question, q, which maps inputs to a finite set of answers. Each such node has a child corresponding to each answer. The state space consists of the leaf nodes of the decision graph which implements the mapping of histories and times to leaf nodes. The set of questions that are considered map histories and times to a finite set of answers.

Figure 3:
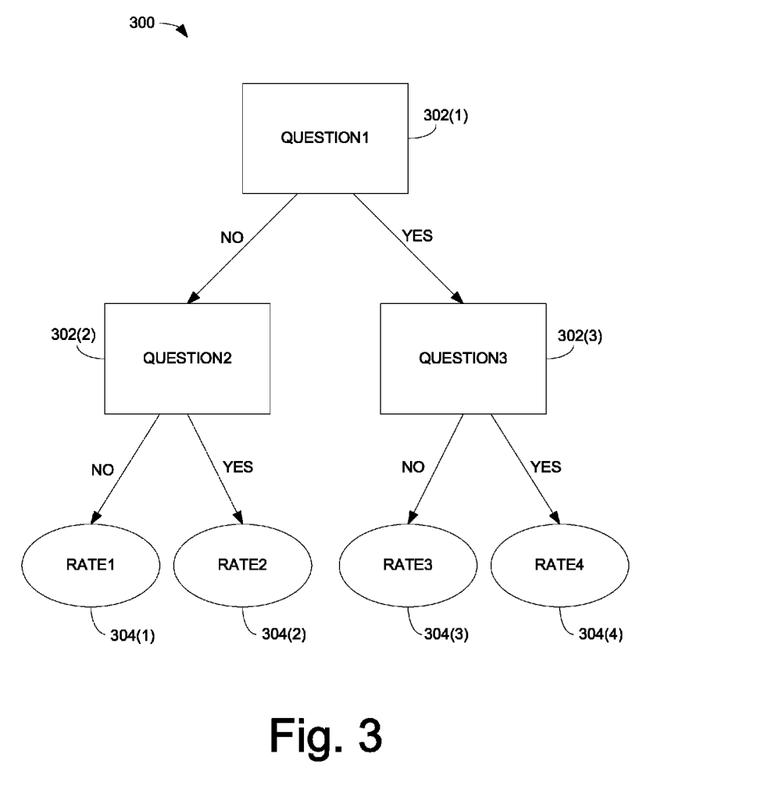
FIG. 3 is a diagram illustrating a decision graph according to one embodiment.

FIG. 3 is a diagram illustrating a decision graph 300 according to one embodiment. Decision graph includes a plurality of decision nodes 302(1)-302(3) (collectively referred to as decision nodes 302), and a plurality of leaf nodes 304(1)-304(4) (collectively referred to as leaf nodes 304). Each decision node 302 comprises a question. The decision process begins at the top or root decision node 302(1), and the answer (yes or no) to the question at that node 302(1) indicates which node 302 to move to next. For example, if the answer to Question1 at node 302(1) is no, the decision process moves to node, 302(2) to answer Question2, and if the answer to Question1 at node 302(1) is yes, the decision process moves to node 302(3) to answer Question3. The questions in the nodes 302 are answered based on the input data 202 (FIG. 2). At the end of the decision graph 300 are a plurality of leaf nodes 304. In one embodiment, each of the leaf nodes 304(1)-304(4) comprises a speed or rate parameter (e.g., Rate1, Rate2, Rate3, and Rate4, respectively).

Graphical event model 206 (FIG. 2) according to one embodiment is used to simulate races (e.g., like a horse race), and the results of those races provide information about future events that will occur and the timing of those future events. The race participants are the various types of events that might occur. Each such event is represented by a decision graph 300 in the model 206. The rate parameters at the leaf nodes 304 of each decision graph define the speed of the race participant corresponding to that decision graph. The speed of each race participant may vary during any given race. The current speed of a race participant is determined by answering the questions in the nodes 302, until a leaf node 304 is reached that indicates the current rate parameter.

As an example, assume that we want to determine if the next query to be issued by a given user will be a car insurance query. Car insurance queries would be an event type that would be a race participant represented by a decision graph 300 in the model 206. The nodes 302 might include questions such as "has the person queried about car insurance in the last minute (or hour, or day, or week, etc.)", or "has the person searched for a new or used car in the last month (or other time frame)". The questions are answered until a leaf node 304 is reached, which defines the current speed for the car insurance query race participant. If the car insurance query race participant wins the race, this indicates that the next query to be issued by the user will be a car insurance query.

Each question in the nodes 302 according to one embodiment includes a temporal element. Thus, when a race participant reaches a particular leaf node 304, and a rate is determined from that node 304, the length of time that the rate is valid can also be determined from the temporal elements of the questions. For example, if one of the questions is "has the user issued a car insurance query in the last seven days", and the input data 202 indicates that the user issued such a query two days ago, the answer to that question will be yes from now until five days from now.

Using the various rates and the amounts of time that the rates are valid, a race simulation may be run to generate a hypothetical sequence of events that might occur, with each such hypothetical event including an associated time stamp. Thus, the first event in the sequence is the next event that is likely to occur, and the time stamp indicates the time that it is likely to occur.

Given a sequence of events that have already occurred, and their respective time stamps, the model gives a rate for each event type and a period for which it is valid. A hypothetical next event and time stamp is generated from a simulated race as follows: For each event type, a finishing time is simulated. The finishing time is drawn from an exponential distribution with the rate parameter corresponding to the event type. If the drawn finishing type is after the validity period, a new rate and validity period is obtained for that event type using the procedure above. After a valid finishing time is obtained for each event type, the winner with the earliest finishing time is chosen, and is accepted as the next hypothetical event. This event is appended onto the sequence of events that has occurred, and new rates and validity periods are found for each event type, and the race is repeated.

In one embodiment, multiple simulations are performed to determine a probability that a certain event will occur within a given future time frame. For example, assume that the system is attempting to determine whether a certain user will issue a car insurance query in the next week. Multiple simulations, such as 1000 simulations, may be performed for that week, resulting in 1000 hypothetical time-stamped sequences of events. In some of the 1000 sequences, the user may issue a car insurance query, and in other ones of the sequences, the user may not issue a car insurance query. The number of sequences in which the user issued a car insurance query divided by the total number of sequences (1000) gives a probability that the user will actually issue a car insurance query in the next week. This process is referred to as forward sampling.

For some applications, the simulation process may involve more or less than 1000 simulations. Some applications may benefit from 1 million or more simulations. However, larger numbers of simulations can be computationally expensive. One way to avoid this issue is to use importance sampling.

One embodiment estimates the probability that a condition of interest will be met in the future. For example, such a condition might be that a user issues at least ten queries for insurance products in the next week. Another example of such a condition is that an unplanned reboot is preceded by a particular system warning in one to two days from now. Given a known history of events 202, event sequences are sampled from the graphical event model 206 through the window of interest (e.g., a future time window), and the proportion of sequences that meet the conditions to be forecast (e.g., that meet count constraints or order constraints) is determined. This proportion is an estimate of the probability that the condition of interest will be met. Again, this process is referred to as forward sampling.

In one embodiment, a Monte Carlo algorithm is used to estimate the probabilities of a sequence of events occurring in specified time intervals, given a history up to some time. For example, we may wish to know the probability that a computer system will experience a hard disk failure in the next week, or that a user will be shown a particular display ad in the next week and then visit the advertising merchant's website in the next month. In one embodiment, an importance sampling procedure is used for such queries, and a forward sampling procedure is used for arbitrary finite duration queries.

Generating a decision graph 300 for the graphical event model 206 involves a couple of steps. The values for the rates at the leaf nodes 304 are determined, and the set of questions for the decision nodes 302 and the order in which to ask them are determined. Regarding setting the values for the rates, each leaf node 304 corresponds to a particular state. For example, assume that the decision process has gone through a given decision graph 300 and reached a leaf node 304 that indicates that the user has issued a car insurance query in the last minute, and has issued a used car query in the last month. The input data 202 (e.g., search logs) for all users is examined, and it is determined how long each user has been in that state (i.e., the state where the user has issued a car insurance query in the last minute and a used car query in the last month). The process next involves determining how many times they actually issued a car insurance query when they were in that state. This gives a count of how many times the event to be predicted occurred in that state. The process also involves determining how long they were in that state, which allows a rate (e.g., a number of occurrences per second) to be determined.

Regarding the determination of the set of questions and the order in which to ask them portion of the construction of the decision graphs, a set of possible questions are provided. Each of the questions is evaluated using the input data 202, and a question that splits the data 202 into the most dissimilar piles or groups is identified. This process is repeated for each resulting pile or group. The process continues until none of the remaining questions are able to split the data into groups that are sufficiently dissimilar (e.g., that satisfy a dissimilarity threshold).

In one embodiment, a factored structural prior is used, and the space of possible structures is searched as follows. The process begins with a trivial decision graph that maps all histories and times to the root node (e.g., node 302(1)). This yields an exponential crude hazard with no dependencies on any labels. The process then involves iteratively splitting and merging nodes in the graph. A node is split by applying a question to get new nodes. The gain in the posterior of the structure due to the split is calculated. A pair of nodes is merged to a new state, generating a new state space. The gain in the posterior of the structure due to this merge is calculated. The next structure is chosen by updating the current structure by choosing the best split or merge, until there is no gain. In one embodiment, the computation of the gain due to a merge or split depends only on the states being merged or split and their associated parameters.

The dissimilarity measure and the gain measure discussed above according to one embodiment are measures of the purity of outcomes in the resulting nodes of the graphical event model. In one embodiment, the nodes in the graph are split or merged greedily in order to maximize the measure of purity. The measure of purity according to one embodiment is one of a Bayesian score, a likelihood, or a penalized likelihood. In one embodiment, after generating the graphical event model, the model is pruned back via cross-validation.

Figure 4:
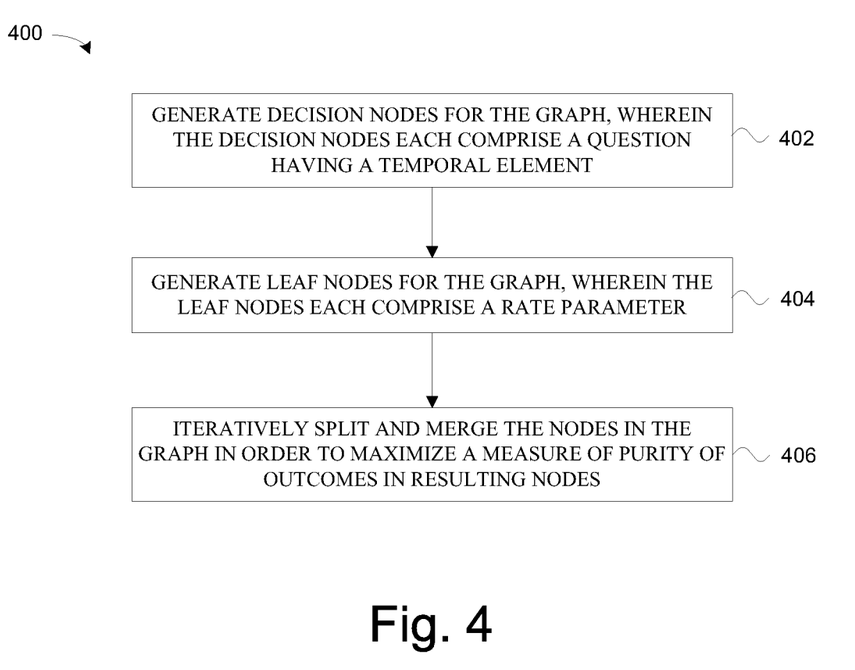
FIG. 4 is a flow diagram illustrating a method of generating a decision graph from event stream data according to one embodiment.

FIG. 4 is a flow diagram illustrating a method 400 of generating a decision graph from event stream data according to one embodiment. The event stream data in method 400 according to one embodiment includes a plurality of events, and each event includes an associated time stamp. At 402 in method 400, decision nodes for the graph are generated, wherein the decision nodes each comprise a question having a temporal element. At 404, leaf nodes for the graph are generated, wherein the leaf nodes each comprise a rate parameter. At 406, the nodes in the graph are iteratively split and merged in order to maximize a measure of purity of outcomes in resulting nodes. In one embodiment, the decision graph in method 400 is a decision tree.

Figure 5:
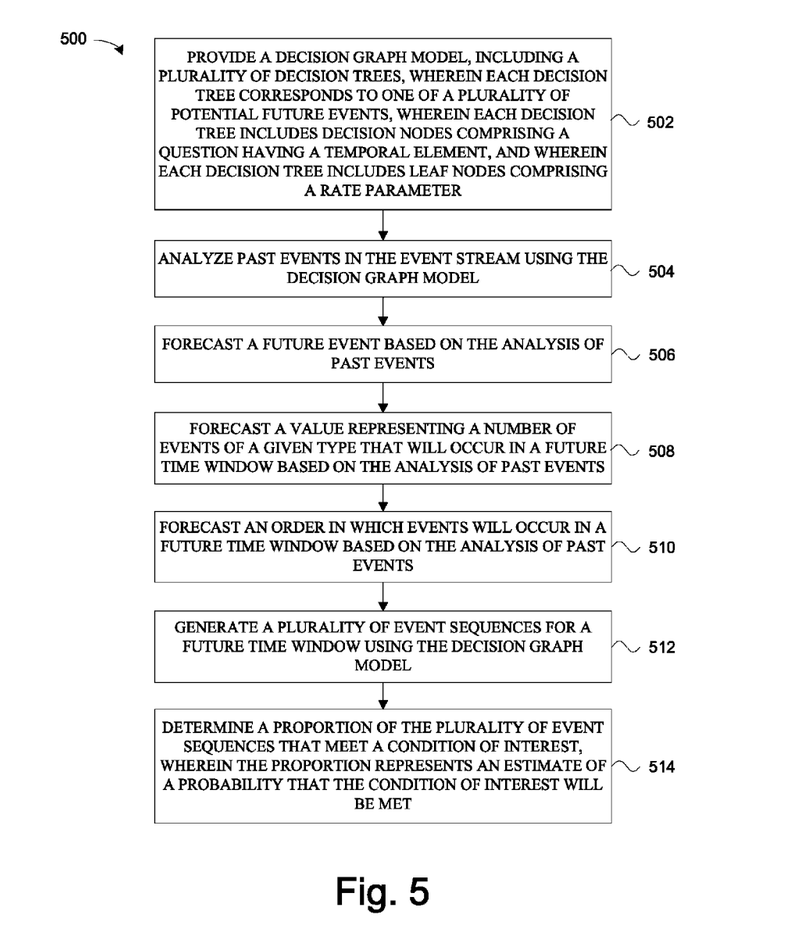
FIG. 5 is a flow diagram illustrating a method for forecasting future events in an event stream according to one embodiment.

FIG. 5 is a flow diagram illustrating a method 500 for forecasting future events in an event stream according to one embodiment. The event stream in method 500 according to one embodiment includes a plurality of events, and each event includes an associated time stamp. At 502 in method 500, a decision graph model is provided, including a plurality of decision trees, wherein each decision tree corresponds to one of a plurality of potential future events, wherein each decision tree includes decision nodes comprising a question having a temporal element, and wherein each decision tree includes leaf nodes comprising a rate parameter. At 504, past events in the event stream are analyzed using the decision graph model. At 506, a future event is forecast based on the analysis of past events at 504. In one embodiment of method 500, a type and a time of the future event is determined directly from the decision graph model. The forecasting at 506 according to one embodiment is done by sampling. In one embodiment, the forecasting at 506 is repeated to generate a hypothetical sequence. Then, the number of events of a certain type can be counted or whether a certain order of events (e.g. A then B then C) can be tested based on this hypothetical sequence. This can then be repeated to determine a proportion.

At 508 in method 500, a value representing a number of events of a given type that will occur in a future time window is forecast based on the analysis of past events. At 510, an order in which events will occur in a future time window is forecast based on the analysis of past events. At 512, a plurality of event sequences for a future time window is generated using the decision graph model. At 514, a proportion of the plurality of event sequences that meet a condition of interest is determined. In one embodiment, the proportion at 514 represents an estimate of a probability that the condition of interest will be met. The condition of interest at 514 according to one embodiment is one of a count constraint and an order constraint.

2. Graphical Event Models

In this section, we introduce the class of Graphical Event Models. We assume that events of different types are distinguished by labels l drawn from a finite alphabet L. An event is then composed of a non-negative time-stamp t and a label l. Thus our data is an event stream, which is a sequence $\mathcal{D} = \{(t_i, l_i)\}_{i=1}^n$ where $0 < t_1 < \ldots < t_n$.

We define the history at time t as $$h(t) = \{(t_i, l_i) | (t_i, l_i) \in \mathcal{D}, t_i \leq t\}$$

and write $h_i = h(t_{i-1})$. By convention $t_0 = 0$. We define the ending time t(h) of a history h as the time of the last event in h: $t(h) = \max\max_{(t,l) \subseteq h} t$ so that $t(h_i) = t_{i-1}$.

Figure 6:
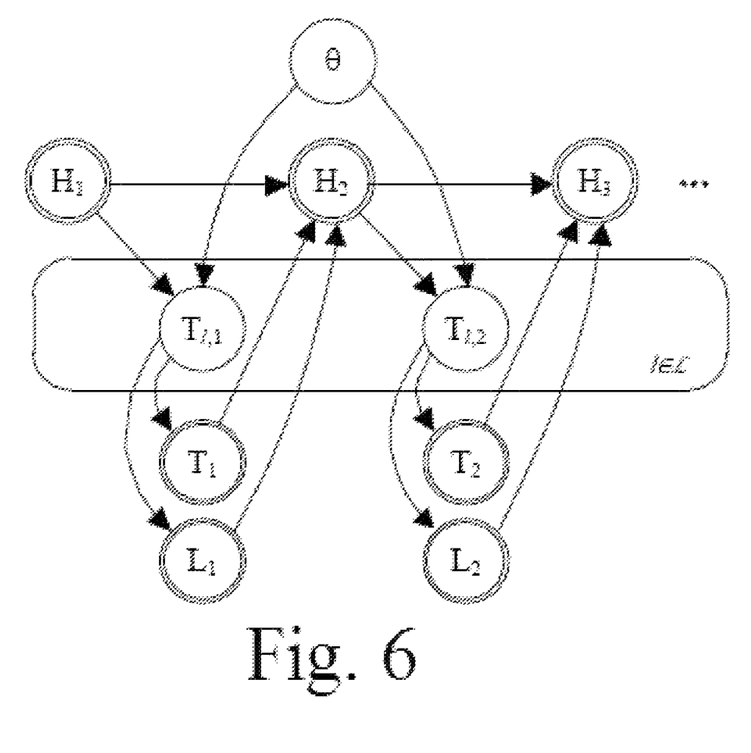
FIG. 6 is a graphical model illustrating a generative model according to one embodiment.

A Graphical Event Model (GEM) consists of a directed graph G over L and a set Z of crude hazards indexed by $l \in L$. Each crude hazard has a CDF $Z_l(t|h; \theta)$ and density $z_l(t|h; \theta)$. The crude hazards define a generative model over D through a competing risks representation, as follows. Given a history $h$, a time $t_{l,i}$ is independently drawn for each label $l \in L$ from the corresponding crude hazard. The earliest of these times and the corresponding label are selected as $(t_i, l_i)$. To ensure that $t_i > t_{i-1} = t(h_i)$, the crude hazards must satisfy $Z_l(t(h)|h) = 0$. The generative model is illustrated using a graphical model in FIG. 6. Note that it has been shown that under mild regularity conditions, any conditional likelihood p(d, l|h) can be represented through crude hazards.

The resulting likelihood of the event stream factors over labels l as $$p(\mathcal{D}|\theta) = \prod_{l \in \mathcal{L}} p_l(\mathcal{D}|\theta) \tag{1}$$

$$p_l(\mathcal{D}|\theta) = \prod_{i=1}^n z_l(t_i|h_i, \theta)^{1_l(l_i)} [1 - Z_l(t_i|h_i, \theta)]^{1_l^c(l_i)} \tag{2}$$

where we have used parametric crude hazards. We write $1\chi(\cdot)$ for the indicator function of a set $\chi$. For convenience, we write $$1 \cdot \overset{C}{\chi}(\cdot)$$

for the indicator of the complement of $\chi$ and $1x(\cdot)$ for the indicator of the singleton $\{x\}$.

Define the filtered history $[h]_K$ as $$[h]_K = \{(t,l) | (t,l) \in h, l \in K\}$$

for $K \subset \mathcal{L}$. The directed graph G defines independencies between labels by constraining the crude hazards to respect $$z_l(t|h) = z_l(t|h|_{\pi(l)}, t > t(h)),$$

for all h and $t > t(h)$, where $\pi(l)$ are the parents of l.

Figure 7:
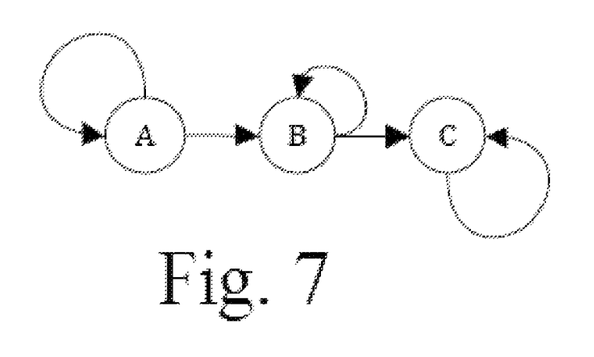
FIG. 7 is a diagram illustrating a graphical representation of a model according to one embodiment.

Example 1. Suppose we have $L = \{A, B, C\}$, where $z_A$ depends only on occurrences of A in h, $z_B$ depends on occurrences of both A and B, and $z_C$ depends on occurrences of both B and C. The model can be represented by the graph of FIG. 7.

2.1 Crude Hazards in Intensity Form

We can write $A_l(t|h)$ for $-\log(1 - Z_l(t|h))$ and $\lambda_l(t|h)$ for its time derivative $$\frac{1}{1 - Z_i(t|h)} z_i(t|h)$$

using the convention $$\frac{0}{0} = 0.$$

The crude hazard CDF and density can then be written $$Z_l(t|h) = 1 - e^{-A_l(t|h)}$$

$$z_l(t|h) = \lambda_l(t|h) e^{-A_l(t|h)}.$$

The per-label likelihood of equation (2) can then be written in terms of the conditional intensity function $\lambda_l(t|h:\theta)$ and $A_l(t|H:\theta) = \int_{-\infty}^{t} \lambda_l(\tau|h:\theta) d\tau$ as $$p_l(\mathcal{D}|\theta) = \prod_{i=1}^{n} \lambda_i(t_i|h_i \cdot \theta)^{1_i(t_i)} e^{-\Lambda_i(t_i|h_i, \theta)}. \quad (3)$$

We note that the terms in equation (3) are the waiting time densities of non-homogeneous Poisson processes whose intensity functions are given by the conditional intensity functions $\lambda_l(t|h:\theta)$. The graphical structure G imposes the restriction $\lambda_l(t|h:\theta) = \lambda_l(t|h|_{\pi(l)}:\theta)$ for $t > t(h)$ on the conditional intensities. Note that any likelihood that meets these structural assumptions can be represented in the form of equation (3). Some extant models of events can be viewed as specifying likelihoods of this form with further modeling assumptions.

2.2 Piecewise Exponential Gems

We consider the class of models where the conditional intensity function is piecewise constant, so that the crude hazard density is piecewise exponential. We call the resulting GEMs piecewise exponential GEMs. We specify such conditional intensity functions in terms of a piecewise constant state trajectory $\sigma_l(t|h)$ taking values in a state space $\Sigma_l$ and a set of rate parameters $\Theta_l = \{\lambda_s\}_{s \in \Sigma_l}$. Writing $S_l = (\Sigma_l, \sigma_l(\cdot|\cdot))$ the resulting crude hazard is $$\sigma_l(t|h, S_l, \Theta_l) = \lambda_{\sigma_l(t|h)} e^{-\Sigma_{s \in \Sigma} \lambda_s d_l(s, t|h)}$$

for $t > t^*(h)$ where $d_l(s, t|h)$ is the duration that $\sigma_l(\cdot|h)$ spent in state s between times t(h) and t. The per-label likelihood can then be written in terms of the number of times $c_l(s)$ label l occurs in state s and the duration $d_l(s)$ s is active, which are given by $$c_i(s) = \sum_{i=1}^{n} 1_s(\sigma_i(t_i|h_i)) 1_i(l_i)$$

$$d_l(s) = \sum_{i=1}^{n} d_e(t_i|h_i)$$

The per-label likelihood in terms of these sufficient statistics is $$p_l(\mathcal{D}|S_l, \Theta_l) = \prod_{u \in \Sigma_l} \lambda_s^{Cl(s)} e^{-\lambda_s Cl(e)} \quad (4)$$

We also note that the graphical structure G imposes the restriction $\sigma_l(t|h) = \sigma_l(t||h|_{\pi(l)})$ on the state trajectories. Since any rate function in equation (3) can be arbitrarily well approximated by a piecewise constant one, this representation of the likelihood is nonrestrictive. A special subclass of piecewise exponential GEMs are the exponential GEMs that have $\sigma_l(t|h) = s(h)$ for $t > t(h)$, resulting in crude hazards which have exponential densities.

3. Learning Gems

In this section, we discuss techniques for learning GEMs. In particular, we concentrate on learning the structure and parameters of piecewise exponential GEMs, giving a conjugate prior under which the posterior over the parameter and the marginal likelihood can both be computed in closed form. This is not possible in the general case, when the crude hazards are not piecewise exponential. The difficulty is that the data only contains truncated observations from $z_l(t|h, \theta)$ for $l \neq l_i$.

In section 3.1, we give a prior distribution over the parameter that allows closed form parameter learning, and show how this also gives a closed form expression for the marginal likelihood. In section 3.2, we show how this can be used in a procedure for learning model structure using decision graphs.

3.1 Closed Form Parameter Learning and Marginal Likelihood

Recall that given the structure $S_l$ the per-label likelihood for piecewise exponential GEMs given in equation (4) factors into a product of per-state likelihoods $\lambda_s^{c_l(s)} e^{-\lambda_s d_l(s)}$ where the count $c_l(s)$ and the duration $d_l(s)$ are sufficient statistics for $\lambda_s$. We note that the Gamma distribution is a conjugate prior for $\lambda_s$ in this per-label likelihood. The prior density is given by $$p(\lambda_s | \alpha_s, \beta_s) = \frac{\beta_s^{\alpha_s}}{\Gamma(\alpha_s)} \lambda_s^{\alpha_s - 1} e^{-\beta_s \lambda_s}$$

Multiplying by the likelihood and normalizing gives $$p(\lambda_x | \alpha_s, \beta_s, \mathcal{D}) \propto \lambda_s^{\alpha_s + c_l(a) - 1} e^{-(\beta_s + d_l(s)) \lambda_s} = p(\lambda_s | \alpha_s + c_l(s), \beta_s + d_l(s))$$

In addition, assuming that $p(\Theta_l|S_l)=\Pi_{s\in\Sigma_l}p(\lambda_x|\alpha_s, \beta_s)$ the marginal likelihood of the data is $$p_l(\mathcal{D}|S_l) = \prod_{s\in\Sigma_l} \gamma_{l,s}$$

$$\gamma_{l,s} = \frac{\beta_s^{\alpha_s}}{\Gamma(\alpha_s)} \frac{\Gamma(a_s + c_l(s))}{(\beta_s + d_l(s))^{\alpha_s + c_l(s)}}$$

We use this expression for the marginal likelihood in building decision graphs to learn the model structure $S_l$.

3.2 Structure Learning with Decision Graphs

In general, the space of possible structures (i.e. all possible state trajectories for all possible histories) is infinite. Modeling assumptions are needed to constrain the structures explored and devise a strategy for searching for a structure in this space. We map histories to state trajectories through decision graphs, and describe a greedy procedure for building such decision graphs. We refer to the resulting GEMs as Decision Graph GEMs (DG-GEMs).

A decision graph is a directed acyclic graph with exactly one root node. Each non-leaf node has associated with it a question q which maps inputs to a finite set $\{1, \ldots, m_q\}$ of answers. Each such node has a child corresponding to each answer. In our case the state space $\Sigma_l$ will consist of the leaves of a decision graph which implements the mapping $\sigma_l(t|h)$ of histories and times to leaves. The set of questions $\mathcal{Q} = \{q(t|h)\}$ we consider will map histories and times to a finite set $\{1, \ldots, m_q\}$ of answers, and are constrained so that the answer trajectory q(t|h) is a piecewise constant function of t for each h. This ensures that $\sigma_l(t|h)$ is a valid piecewise constant state trajectory.

For example, given a label l' ∈h, two times d1<d2, and a thresholdτ, whether or not the count of l' in h exceeds τ in the time window [t–d$_2$, t–d$_l$) is such a question with two possible answers.

We use a factored structural prior $p(S_l) \propto \Pi_{s\in S_l} N_s$ and search the space of possible structures as follows. We begin with the trivial decision graph that maps all histories and times to the root. This yields an exponential crude hazard with no dependencies on any labels. We then iteratively split and merge leaves in our graph. We split a leaf s∈$S_l$ by applying a question q∈$\mathcal{Q}$, to get $m_q$ new leaves $s_l, \ldots, s_{m_q}$. The new state space is $S'_l=(S_l-\{s\})\cup\{s_l, \ldots s_{m_q}\}'$. The gain in the posterior of the structure due to this split is $$\text{Gain}(s \to s_1, \ldots, s_{m_q}) = \frac{p(S'|\mathcal{D})}{p(S|\mathcal{D})} \quad (5)$$

$$= \frac{\prod_{j=1}^{m_q} \kappa_{l,s_j} \gamma_{l,s_j}}{\kappa_{l,s_j} \gamma_{l,s_j}}$$

A pair of leaves $s_1, s_2 \in S_l$ are merged to a new state s, generating a new state space $S'_l=(S_l-\{S_1, S_2.\})\cup\{s\}$.

The gain in the posterior of the structure due to this merge is $$\text{Gain}(s_1, s_2 \to s) = \frac{p(S'|\mathcal{D})}{p(S|\mathcal{D})} \quad (6)$$

$$= \frac{\kappa_{l,s} \gamma_{l,s}}{\kappa_{l,s_1} \gamma_{l,s_1} + \kappa_{l,s_2} \gamma_{l,s_2}}$$

The next structure $S'_l$ is chosen by updating the current structure $S_l$ by choosing the best split or merge, until there is no gain. As seen in equations (5) and (6), the computation of the gain due to a merge or split depends only on the states being merged or split and their associated parameters. In particular, ifs is split into $s_l, \ldots, s_m$ or $s_l, \ldots, s_m$ are merged into s, $c_x(l)=\Sigma_{k=1}^m c_{s_k}(l)$ and $d_s(l)=\Sigma_{k=1}^m d_{s_k}(l)$.

Remark 1. Given a partitioned label space $\mathcal{L} = \cup_{j=1} \mathcal{L}_j$ as in example 3, let the candidate question set $\mathcal{Q} = \{q_j\}_{j=1}^k$ where $q_j(t|h)$ gives the last member of $L_j$ in h. Building a DG-GEM with these candidate questions allows us to learn a CTBN with both local and global structure as has been done for Bayes nets.

4. Inference

In this section we describe Monte Carlo algorithms to estimate the probabilities of a sequence of labels occurring in specified time intervals, given a history up to some time. For example, we may wish to know the probability that a computer system will experience a hard disk failure in the next week, or that a user will be shown a particular display ad in the next week and then visit the advertising merchant's website in the next month. Exact answers to such queries cannot be computed efficiently in general because the probability of events of interest can depend on arbitrary numbers of intervening events. We first present a forward sampling procedure for arbitrary finite duration queries, and then present an importance sampling scheme for queries of the form described above.

4.1 Forward Sampling

We wish to approximate the conditional probability of sequences $D_h$ extending history h satisfying some property E. We assume E is defined as a set of sequences D, and that there is some finishing time $t_E$ such that $1_E(D)$ can be computed from $\{(t_1, l_i) \in \mathcal{D} : t_i \leq t_E\}$. This allows us to sample finite continuations $D_h$ of h up to time $t_E$ in order to estimate p(E|h). Note that if the model is explosive so that $\lim_{i, >co} t_i < t_E$ with non-zero probability, forward sampling can fail. If we sample M extensions $\{\mathcal{D}_h^{(m)}\}_{m=1}^m$ of h we can estimate the conditional probability p(E|h) of E being satisfied using $$\hat{p}_{Fwd}(E|h; M) = \frac{1}{M} \sum_{m=1}^M 1_E(\mathcal{D}^{(m)})$$

By Hoefding's inequality, $P(|\hat{p}_{Fwd}(E|h; M) - p(E|h)| \geq \epsilon) \leq 2e^{-\epsilon IN! >E) 5\ 2e-2\epsilon M}_2$. Thus, the error in $\hat{P}_{Fwd}(E|h; M)$ falls as $0(1/\sqrt{M})$.

We sample $D_h$ using a generalization of a CTBN forward sampling approach to general GEMs. The graph structure of GEMs implies that we need only sample labels l that E directly depends on and their ancestors, since E does not depend on the other labels. We restrict attention to only these labels. Pseudo Code Example I gives an algorithm Forward-Sample(h, t) for forward sampling an extension of a history h up to time t. The estimator $P\hat{p}_{Fwd}(E|h; M)$ uses M samples drawn using $D(^m) = \text{ForwardSample}(h, t_E)$.

PSEUDO CODE EXAMPLE I

---
Algorithm 1 FORWARDSAMPLE (h, t)
---
```
for all l do
    t_l ← z_l(·|h)
end for
loop
    l* ← arg min t_l, l
    t* ← t_l*
    if t* > t then
        return h
    end if
    h ← h ∪ {(t*, l*)}
    t_l* ← z_l(·|h)
    for all children l of l* do
        t_l ← z_l(·|h)
    end for
end loop
```
---

In the case of piecewise exponential hazards, sampling from $z_l(\cdot|h)$ can be done by first sampling from the first piece, and if the sampled time is greater than the first boundary, then sampling from the next piece, and so on. A time savings is possible in this case by using lazy evaluation. Instead of sampling from $z_l(\cdot|h)$ in the algorithm in Pseudo Code Example 1, a sample is drawn from the first piece of $z_l(\cdot|h)$. The sampled time is truncated to the boundary of that piece, and a flag is stored indicating whether or not the time was actually truncated. The truncation flag corresponding to the minimum time is checked after the minimization step, and if it was truncated, a replacement is drawn from the next piece of $z_l(t|h)$ and truncated, and the minimization repeated.

4.2 Importance Sampling

When we are interested in the probability of an unlikely event, most of our samples lie outside E, and our estimate of p(E|h) will be noisy.

Since absolute error in $\hat{p}_{Fwd}$ falls quadratically, we need $O(1/p(E|h)^2)$ samples to get useful estimates. In practice, this problem can be mitigated by using importance sampling, where sequences are drawn from a proposal distribution other than the model and weighted to account for this difference. The proposal distribution is chosen to generate samples satisfying E more frequently. Thus, we will sample $\mathcal{D}_k^{(m)}$ from our proposal distribution $q(D_h)$ instead of $p(D_h|h)$, and will estimate p(E|h) through $$p_{Imp}(E|h; M) = \frac{1}{\sum_{m=1}^{M} w^{(m)}} \sum_{m=1}^{M} w^{(m)} 1_E(\mathcal{D}^{(m)})$$

where $$w^{(m)} = \frac{p(\mathcal{D}_h^{(m)}|h)}{q(\mathcal{D}_h^{(m)})}$$

We give a proposal distribution for events E specified by a set of ordered constraints $C = \{(l_j^C, a_j^C, b_j^C)\}_{j=1}^{k}$ with $b_{j-1}^C < b_j^C$. Sequences $\mathcal{D} \in E$ must contain the labels $l_j^C$ in the specified order and in the specified intervals. That is, $$E_C = \{\mathcal{D} \mid \exists i_1 < \ldots < i_k : l_{i_j} = l_j^C, t_{i_j} \in [d_j^C, b_j^C]\}.$$

We sample proposals $D_h$ using a Poisson Superposition Importance Sampler. We will forward sample $D_h$ from our model, but in each interval $[a_j^C, b_j^C]$ we will sample an additional event with label $l_{j,hu\ C}$ and time $t_j^C$ from an auxiliary Poisson process with intensity $\lambda_j(t|a_j)$. $\lambda_j(t|a_j)$ is chosen so that $\lambda_j(t|a) = 0$ for $t < a$. The additional event is rejected outright if it is after $b_j^C$. It is only accepted if no events with label $l_j^C$ are generated by the model in the interval $[a_j, t_j^C]$. Note that in order to get a correct importance sampler, the auxiliary process must have support after $b_j^C$ to ensure that we sometimes sample sequences from the model. In our experiments, we use $\lambda_j(t|a_j) = 1/(b_j^C - a_j)$ for $t > a_j$.

The starting time $a_j$ for the auxiliary process is typically $a_j^C$, but in the case of overlapping intervals, it is adjusted to ensure that only one auxiliary process is running at any time. Since at most one event with label $l_j^C$ from the auxiliary process is used, it is active only until $b_j$, which is the time of the first occurrence of $l_j^C$ in $[a_j, b_j^C]$, no such event. Using the Poisson superposition property, we can write the corresponding importance weight as $$w = \prod_{j=1}^{k^C} \frac{1}{e^{-\Lambda_j(b_j|a_j)}} \prod_{\substack{i:t_i=b_j \\ t_i = t_j^C}} \frac{\lambda_{l_j^C}(t_i|h_i)}{\lambda_{l_j^C}(t_i|h_i) + \lambda_j(t_i|a_i)}$$

where $\Lambda_j(b|a) = \int_a^b \lambda_j(t|a)dt$. By definition, the second product has at most one term.

Note that w has $k^C$ terms corresponding to the $k^C$ constraints, which is independent of the number of events sampled. This contrasts with a previous importance sampling scheme for CTBNs, where an arbitrary number of forcing terms can occur in each weight. Thus, we do not experience the problem of degenerate weights, and do not need to resort to particle filtering.

The resulting importance weights and samples are generated using the algorithm given in Pseudo Code Example II by $(w(^m), D(^m)) = \text{ImportanceSample}(h, \{(l_j^*, a_j, b_j)\}_{i=1}^k)$.

PSEUDO CODE EXAMPLE II

---
Algorithm 2 IMPORTANCESAMPLE (h, C)
---
```
w ← 1
for j = 1, . . . , k^C do
    a ← max{a_j^C, t(h)}
    b ← b_j^C
    t ← λ_j(t|a)e^(-Λ_j(t|a))
    (h, λ) ← FORCING FORWARDSAMPLE(h, a, b_j^C, t, l_j^C)
    i ← |h|
    if l_i = l_j^C then
```

$$w \leftarrow w \times \frac{\lambda}{\lambda + \lambda_j(t_i|a)}$$

```
        b ← t_i
    end if
```

$$w \leftarrow w \times \frac{1}{e^{-\Lambda_j(b|a)}}$$

```
end for
return (w, h)
```
---

The subroutine ForcingForwardSample(h, a, b, t, l) is a version of ForwardSample(h, b) that generates samples conditioned on h after a. ForcingForward-Sample terminates if an event of type 1 is generated. If t <b and forward sampling does not yield an event of type 1 before time t, ForcingForwardSample forces the event (t, 1) and terminates. In both of these cases, it returns the intensity $\lambda_l$ (·|h) at that time. ForcingForwardSample terminates at time b if an event of type 1 is not produced.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of generating a decision graph from event stream data, wherein the event stream data includes a plurality of events, and each event includes an associated time stamp, the method comprising:

generating decision nodes for the graph, wherein the decision nodes each comprise a question having a temporal element, and wherein the graph represents a race participant in a race simulation;

generating leaf nodes for the graph, wherein the leaf nodes each comprise a rate parameter defining a speed of the race participant for determining a finishing time of the race participant in the race simulation; and iteratively splitting and merging nodes in the graph in order to maximize a measure of purity of outcomes in resulting nodes.

2. The method of claim 1, wherein the decision graph is a decision tree.

3. The method of claim 1, wherein the nodes in the graph are split or merged greedily in order to maximize the measure of purity.

4. The method of claim 3, wherein the measure of purity is a Bayesian score.

5. The method of claim 3, wherein the measure of purity is a likelihood.

6. The method of claim 3, wherein the measure of purity is a penalized likelihood.

7. The method of claim 1, and further comprising:

after generating the decision graph, pruning back the generated decision graph.

8. The method of claim 7, where the pruning is done via cross-validation.

9. A computer-readable storage medium storing computer-executable instructions that when executed by at least one processor cause the at least one processor to perform a method of generating a decision tree from event stream data, wherein the event stream data includes a plurality of events, and each event includes an associated time stamp, the method comprising:

generating decision nodes for the tree, wherein the decision nodes each comprise a question having a temporal element, and wherein the graph represents a race participant in a race simulation;

generating leaf nodes for the tree, wherein the leaf nodes each comprise a rate parameter defining a speed of the race participant for the race simulation to generate a hypothetical sequence of the events that might occur in the future based on finishing times in the race simulation; and iteratively splitting and merging nodes in the tree in order to maximize a measure of purity of outcomes in resulting nodes.

10. The computer-readable storage medium of claim 9, wherein the nodes in the tree are split or merged greedily in order to maximize the measure of purity.

11. The computer-readable storage medium of claim 9, wherein the measure of purity is one of a Bayesian score, a likelihood, and a penalized likelihood.

12. A method for forecasting future events in an event stream, wherein the event stream includes a plurality of events, and each event includes an associated time stamp, the method comprising:

providing a decision graph model including a plurality of decision trees, wherein each decision tree represents one of a plurality of race participants in a race simulation and corresponds to one of a plurality of potential future events, wherein each decision tree includes decision nodes comprising a question having a temporal element, and wherein each decision tree includes leaf nodes comprising a rate parameter defining a speed of one of the race participants for determining a finishing time in the race simulation;

analyzing past events in the event stream using the decision graph model; and forecasting a future event based on the analysis of past events.

13. The method of claim 12, wherein a type of the future event is determined directly from the decision graph model.

14. The method of claim 12, wherein a time of the future event is determined directly from the decision graph model.

15. The method of claim 12, where the forecasting is done by sampling.

16. The method of claim 12, and further comprising:

forecasting a value representing a number of events of a given type that will occur in a future time window based on the analysis of past events.

17. The method of claim 12, and further comprising:

forecasting an order in which events will occur in a future time window based on the analysis of past events.

18. The method of claim 12, and further comprising:

generate a plurality of event sequences for a future time window using the decision graph model; and determine a proportion of the plurality of event sequences that meet a condition of interest.

19. The method of claim 18, wherein the proportion represents an estimate of a probability that the condition of interest will be met.

20. The method of claim 19, wherein the condition of interest is one of a count constraint and an order constraint.

* * * * *